United States Patent
Tbatou (10) Patent No.: US 10,439,469 B2
(45) Date of Patent: Oct. 8, 2019

(54) DUAL CAM TORQUE TRANSFER MECHANISM

(71) Applicant: Fraen Mechatronics, LLC, Reading, MA (US)

(72) Inventor: Jamal Tbatou, Besancon (FR)

(73) Assignee: Fraen Mechatronics, LLC, Reading, MA (US)

( * ) Notice: Subject to any disclaimer, the term of this patent is extended or adjusted under 35 U.S.C. 154(b) by 562 days.

(21) Appl. No.: 14/538,498

(22) Filed: Nov. 11, 2014

(65) Prior Publication Data
US 2015/0130333 A1 May 14, 2015

Related U.S. Application Data (60) Provisional application No. 61/902,982, filed on Nov. 12, 2013.

(51) Int. Cl.
*H02K 7/00* (2006.01)
*H02K 26/00* (2006.01)
*H02K 7/118* (2006.01)

(52) U.S. Cl.
CPC .............. *H02K 7/003* (2013.01); *H02K 7/118* (2013.01); *H02K 26/00* (2013.01)

(58) Field of Classification Search
CPC .......... H02K 7/003; H02K 7/10; H02K 7/108; H02K 7/1085; H02K 7/11; H02K 7/116;
(Continued)

(56) References Cited

U.S. PATENT DOCUMENTS

| 3,689,853 A | * | 9/1972 | Badger | ................. H03J 1/14 334/45 |
| 3,987,680 A | * | 10/1976 | Naoi | ................ H03J 1/14 74/10.41 |

(Continued)

FOREIGN PATENT DOCUMENTS

GB       1550376 A       8/1979

OTHER PUBLICATIONS

International Search Report/Written Opinion for PCT/US2014/065017 dated Sep. 29, 2015; date of completion Sep. 11, 2015.

(Continued)

*Primary Examiner* — Quyen P Leung
*Assistant Examiner* — Eric Johnson
(74) *Attorney, Agent, or Firm* — Pepper Hamilton LLP (57) ABSTRACT

In one aspect, an actuator assembly is disclosed, which includes an input shaft, an output shaft, and a limited angle actuator that is coupled to the input shaft for rotating the input shaft to generate an input torque profile over an input stroke. A rotatable input element having a first cam profile is adapted to couple to the input shaft to rotate therewith, and a rotatable output element having a second cam profile is coupled to the output shaft to rotate with that shaft. The actuator assembly further includes at least one coupling element for rotationally coupling the rotatable input element to the rotatable output element to transfer a rotary motion of the input shaft to the output shaft to generate an output torque profile over an output stroke. The first and second cam profiles are configured such that the output profile is different than the input profile.

21 Claims, 11 Drawing Sheets

(58) Field of Classification Search
CPC ........ H02K 7/118; H02K 7/01; H02K 26/002;
F16D 3/44; F16D 3/48; F16K 31/043;
F16K 31/045; F16H 25/04; F16H 25/06;
F16H 2025/063
USPC ............ 310/75 R, 75 D, 78, 80, 84, 92–100;
74/567–569; 464/137, 138; 251/129.13
See application file for complete search history.

(56) References Cited

U.S. PATENT DOCUMENTS

| | | | | |
|---|---|---|---|---|
| 5,169,121 A | * | 12/1992 | Blanco | F24F 13/1426 |
| | | | | 200/47 |
| 5,312,306 A | * | 5/1994 | Folino | F16H 25/06 |
| | | | | 475/196 |
| 5,321,988 A | * | 6/1994 | Folino | F16H 25/06 |
| | | | | 475/196 |
| 6,125,711 A | * | 10/2000 | Bursal | F16H 25/06 |
| | | | | 475/196 |
| 2005/0061091 A1 | | 3/2005 | Kato | |
| 2005/0241702 A1 | * | 11/2005 | Blomquist | F02D 9/1065 |
| | | | | 137/625.31 |
| 2013/0256076 A1 | | 10/2013 | Malki et al. | |

OTHER PUBLICATIONS

European Examination Report recieved in Application No. 14806505.5, dated Jun. 14, 2017; 5 Pages.

\* cited by examiner

DUAL CAM TORQUE TRANSFER MECHANISM

RELATED APPLICATIONS

This application claims the priority to U.S. Provisional Application No. 61/902,982, filed Nov. 12, 2013, which is hereby incorporated in its entirety by reference.

BACKGROUND

The present invention is generally directed to a mechanism for transforming an input torque profile to an output torque profile and to actuator assemblies that employ such a mechanism.

Torque motors are employed in a variety of applications, e.g., to open and close exhaust gas recirculation (EGR) valves in automobiles. Such applications typically require a high torque at the beginning of a stroke to initiate movement of a component followed by a lower torque to maintain the movement against resistive forces. Conventional torque motors typically do not allow tailoring their torque profile to a particular application. For example, they can provide a substantially uniform torque over the entire range of a stroke, which can result in the torque motor providing a higher torque than needed over a large portion of the stroke. In other words, the torque motor would provide a torque corresponding to the peak torque demand even when a lower torque is needed. This can, in turn, lead to inefficient use of energy as well as a bigger size for the torque motor.

Accordingly, there is a need for mechanisms that allow tailoring a torque profile of a torque motor to a particular application.

SUMMARY

In one aspect, an actuator assembly is disclosed, which includes an input shaft, an output shaft, and a limited angle actuator that is coupled to the input shaft for rotating the input shaft to generate an input torque profile over an input stroke. A rotatable input element having a first cam profile is adapted to couple to the input shaft to rotate therewith, and a rotatable output element having a second cam profile is coupled to the output shaft to rotate with that shaft. The actuator assembly further includes at least one coupling element for rotationally coupling the rotatable input element to the rotatable output element to transfer a rotary motion of the input shaft to the output shaft to generate an output torque profile over an output stroke. The first and second cam profiles are configured such that the output torque profile is different than the input torque profile. For example, in some embodiments, the input torque profile can be substantially constant over the input stroke while the output torque profile is non-uniform over the output stroke, e.g., the output torque profile can include linearly increasing and decreasing portions.

In some embodiments, the input shaft is collinear (coaxial) with the output shaft along a rotational axis. In some such embodiments, the coupling element is configured to remain rotationally fixed relative to the rotational axis and configured to move radially relative to the rotational axis. The coupling element can include components, e.g., rollers, that are rotatable about an axis of the coupling element.

In some embodiments, the coupling element can include an inferior portion engaged with the first cam profile and a superior portion engaged with the second cam profile so as to transfer rotary motion of the rotatable input element to the rotatable output element. In some embodiments, the coupling element is configured to remain rotationally fixed relative to the axis of rotation of the input and output shafts.

In some embodiments, the rotatable input element comprises a first rotatable plate and the first cam profile comprises a curvilinear boundary of an opening formed in that rotatable plate; and the rotatable output element comprises a second rotatable plate and the second cam profile comprises a curvilinear boundary of an opening formed in the second plate. In some such embodiments, the coupling element comprises an inferior portion adapted to engage with said curvilinear boundary of the opening formed in the first rotatable plate and a superior portion adapted to engage with the curvilinear boundary of the opening formed in the second rotatable plate, wherein a displacement of the superior portion of the coupling element within the second opening effects the rotation of the output shaft. In some embodiments, the coupling element comprises at least one roller. Further, in some embodiments, the actuator assembly can include a pin to which the roller is slidably coupled. The pin can extend radially beyond a perimeter of the input and output plates. Further, the pin can be configured to engage with a rotation stop, which can be, e.g., a slot formed in a housing of the actuator.

In some embodiments, a failsafe spring mechanism can be coupled to the output shaft of the actuator to exert a restoring force as the output shaft rotates. By way of example, in some embodiments, one end of the spring is attached to the output shaft and the other end of the spring is attached to the torque actuator's housing.

In a related aspect, a torque actuator is disclosed, which includes an input shaft and an output shaft, an electromagnetic actuating mechanism coupled to the input shaft for rotating the input shaft so as to generate an input torque profile over an input angular range, and a coupling mechanism for rotationally coupling the input shaft to the output shaft. The coupling mechanism is configured to transfer a rotary motion of the input shaft to the output shaft so as to generate an output torque profile over an output angular range, wherein the input torque profile is different than the output torque profile. The coupling mechanism comprises an input plate having at least one slot formed therein, said input plate being coupled to the input shaft such that a rotation of the input shaft causes a rotation of the input plate; an output plate having at least one slot formed therein, said output plate being coupled to the output shaft; and a coupling element extending between the slots of the input and the output plates, wherein the slots are shaped so as to transform the input torque profile to the output torque profile. In some embodiments, the input and the output shafts are coaxial. In some embodiments, the coupling element comprises a roller having an inferior portion engaged with the slot of the input plate and a superior portion engaged with the slot of the output plate.

In a related aspect, an actuator assembly is disclosed, which includes a limited angle actuator having an input shaft for generating an input torque having an input torque profile over an input stroke, and an input plate for coupling to the input shaft. The actuator assembly further comprises an output shaft and an output plate coupled to the output shaft, and a coupling mechanism for movably coupling the input plate to the output plate so as to transfer a rotary motion of the input plate to the output plate to generate an output torque profile over an output stroke, wherein the output torque profile is different from the input torque profile. The output profile can vary over the output stroke as a function of angular position of the output plate relative to the input plate.

In a related aspect, an actuator assembly is disclosed, which includes an input shaft, an output shaft, and a limited angle actuator coupled to the input shaft for rotating the input shaft to generate an input torque profile over an input angular stroke. The actuator assembly includes a rotatable input element that includes a pair of input cam profiles and that is adapted to couple to the input shaft to rotate therewith. The actuator assembly further includes a rotatable output element that includes a pair of output cam profiles and that is adapted to couple to the output shaft to rotate therewith. A pair of rollers rotatably couple the rotatable input element to the rotatable output element. Each roller includes an inferior portion for engaging with one of the input cam profiles and a superior portion for engaging with one of the output cam profiles. In some embodiments, the input and the output shafts are coaxial along a rotation axis. In some embodiments, the rotatable input element includes a rotatable input plate and the pair of input cam profiles include boundaries of a pair of openings (slots) formed in that plate. Further, in some embodiments, the rotatable output element includes a rotatable output plate and the pair of output cam profiles include boundaries of a pair of openings formed in that plate.

In one aspect, an actuator assembly is disclosed, which includes a rotatable input shaft, a limited angle actuator coupled to the input shaft for rotating the shaft to generate an input torque profile over a stroke (i.e., a range of rotational motion), and an input rotatable element (e.g., a rotatable plate) having at least one opening (e.g., a slot), wherein the input element is coupled to the shaft to rotate therewith. The actuator assembly can further include a rotatable output shaft and a rotatable output element (e.g., a rotatable plate) coupled to the output shaft to rotate therewith, where the output element includes at least one opening (e.g., a slot). At least one coupling element, e.g., a roller, engages with the openings of the input element and the output element to rotatably couple the two together. A rotation of the input element mediated by the input shaft can cause a rotation of the output element and consequently that of the output shaft so as to generate an output torque profile over the stroke such that the output torque profile is different than the input torque profile. For example, the shapes of the openings and the angular juxtaposition of the openings of the two input and output elements relative to one another can be selected to transform an input torque profile to a desired output torque profile.

In some embodiments, the input shaft and the output shaft are axially aligned. In other embodiments, an axis of rotation of the input shaft can be offset relative to an axis of rotation of the output shaft.

In some embodiments, the at least one coupling element is slidably disposed on a pin, where the pin is fixedly attached to a housing of the actuator assembly. By way of example, the pin can engage with a rotation stop (e.g., a slot) provided in the housing. In this manner, the coupling element can move radially, e.g., relative to the axis of rotation of the input and/or output plates.

In some embodiments, the at least one coupling element can include an inferior portion disposed in the opening of the input element and a superior portion disposed in the opening of the output element, wherein rotation of the input element is effective to displace the inferior portion of the coupling element radially within the opening of the input element and the superior portion of the coupling element radially within the opening of the output element. The rotation of the input element causes the inferior portion of the coupling element to rotate about an axis of the coupling element, which in turn causes the rotation of the superior portion of the coupling element. The rotation of the superior portion in turn causes the rotation of the output element.

In a related aspect, a torque actuator is disclosed that includes a rotatable input shaft and an output shaft, an electromagnetic actuating mechanism coupled to the input shaft for rotating the input shaft so as to generate an input torque profile over an angular range, and a coupling mechanism for rotationally coupling the input shaft to the output shaft, where the mechanism transfers the rotary motion of the input shaft to the output shaft so as to generate an output torque profile over said angular range that is different than said input torque profile.

In some embodiments, the coupling mechanism can include an input plate having at least one slot formed therein, wherein the input plate is coupled to the input shaft such that a rotation of the input shaft can cause a rotation thereof. The coupling mechanism can further include an output plate coupled to the output shaft and having at least one slot formed therein, and a coupling element extending between the slots in the input and output plates. The slots can be shaped so as to transform the input torque profile to the output torque profile.

In a related aspect, an actuator assembly is disclosed, which includes a limited angle actuator having an input shaft for generating an input torque having an input torque profile over a stroke, an input plate for coupling to said input shaft, an output shaft, and an output plate coupled to the output shaft. The actuator assembly can further include a coupling mechanism for movably (e.g., rotatably) coupling the input plate to the output plate so as to transfer a rotary motion of the input plate to the output plate to generate an output torque profile over said stroke that is different than said input torque profile. In some embodiments, the output torque profile can vary as a function of angular position of the output plate relative to the input plate.

Further understanding of various aspects of the invention can be obtained by reference to the following detailed description in conjunction with the associated drawings.

DETAILED DESCRIPTION

The present invention is generally directed to actuator assemblies in which a plurality of cam profiles (herein also referred to cam tracks) are employed to transform an input torque profile into a desired output torque profile. In some embodiments, the output angular stroke can be different than the input angular stroke. The terms used herein for describing various aspects of the invention have their ordinary meaning in the art. The following definitions are provided for further clarity:

The term 'cam' as used herein refers to a rotatable element (piece) that includes a cam profile, e.g., in the form of a curvilinear boundary surface such as a boundary surface of an opening (slot) formed in the element.

The terms 'about' and 'approximately' are used herein interchangeably and are intended to indicate a variation in a range of +/−5 percent in a numerical value which they qualify.

The term "substantially uniform" is intended to indicate a variation from uniformity of at most 5 percent.

With reference to FIGS. 1A, 1B, 1C, 1D, and 1E, an actuator assembly 10 according to an embodiment of the present teachings includes a limited angle actuator 12 (herein also referred to as a torque motor), a rotatable input shaft 14 and a rotatable output shaft 16. The actuator assembly 10 further includes a rotary motion coupling mechanism 18 for transferring a rotary motion of the input shaft 14 to a rotary motion of the output shaft 16. As discussed in more detail below, the coupling mechanism 18 can transfer the rotary motion of the input shaft to the output shaft so as to cause a rotary motion of the output shaft such that the output torque profile is different than the input torque profile. The input torque profile and the output torque profile refer, respectively, to torque values that the input shaft and the output shaft are capable of applying, e.g., to an device (such as a valve) coupled thereto, as a function of the stroke angle.

In this embodiment, the limited angle actuator 12, the rotatable input and output shafts 14/16 as well as the coupling mechanism are disposed in a housing 20, which includes a top cover 22 having slots 24a/24b for receiving a non-rotating guide 26 of the coupling mechanism 18.

The limited angle actuator 12 engages with the rotatable input shaft 14 and causes its rotation about a rotation axis (RA). In some embodiments, the limited angle actuator 12 can cause a rotation of the input shaft over a stroke angle in a range of about 60 degrees to about 110 degrees, e.g., in a range of about 90 degrees to about 110 degrees. A variety of limited angle actuators can be utilized in the practice of the present teachings. One example of a suitable limited angle actuator is described in published U.S. Patent Application No. 2011/0101813 entitled "Rotary Single-Phase Electromagnetic Actuator," which is herein incorporated by reference in its entirety.

Figure 2A:
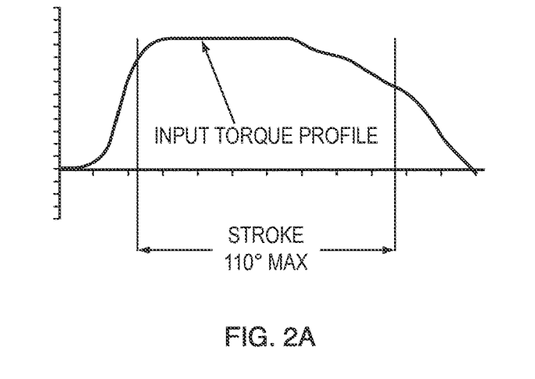
FIGS. 2A-2C depict an exemplary input torque profile, its transformation via one cam, and its transformation via two cams according to an embodiment of the present teachings, FIGS. 3A-3E schematically shows angular positions of the input and output cams relative to one another and the radial distances of rollers relative to the rotation axis in a torque actuator according to the present teachings at four different stroke angles and the output torque generated at each of those stroke angles.

The rotation of the input shaft caused by the limited angle actuator 12 can be characterized by an input torque profile. By way of illustration, FIG. 2A depicts an exemplary input torque profile over a stroke angle range of about 110 degrees. The rotation of the output shaft can be characterized by an output torque profile. As discussed in more detail below, the coupling mechanism 28 can transform the input torque profile to the output torque profile. By way of example, FIG. 2C illustrates an output torque profile that can be obtained by transforming the input torque profile depicted in FIG. 2A via a coupling mechanism according to the present teachings. The exemplary output torque profile exhibits a slight increase in the output torque as the rotation begins followed by a substantially linear decrease of the torque as a function of stroke angle up to a stroke angle of about 40 degrees after which the output torque remains substantially uniform as a function of the stroke angle.

While in this embodiment the input shaft and the output shaft are axially aligned, in other embodiments, they can be offset relative to one another With reference to FIGS. 1A, 1D, 1E, and 1F, the coupling mechanism 18 includes a rotatable input element 28 in the form of a plate (herein also referred to as an input cam), and a rotatable output element 30, which is also in the form of a plate (herein also referred to as an output cam). The rotatable input element 28 includes a pair of cam profiles in the form of curvilinear boundaries 32'/34' of two openings 32 and 34 formed therein (herein referred to also as slots), which are symmetrically disposed about the rotation axis RA. Each slot 32/34 is formed by a curvilinear boundary surface, which includes an inner portion 32a/34a and an outer portion 32b/34b, which collectively form a smooth surface. In this embodiment, each of the inner portions 32a/34a includes a convex central segment flanked by concave portions while each of the outer portions 32b/34b is formed as a continuous convex surface. While in this embodiment the slots 32 and 34 have similarly shaped boundary surfaces, in other embodiments the boundary surfaces of the two slots can have different shapes.

Figure 1A:
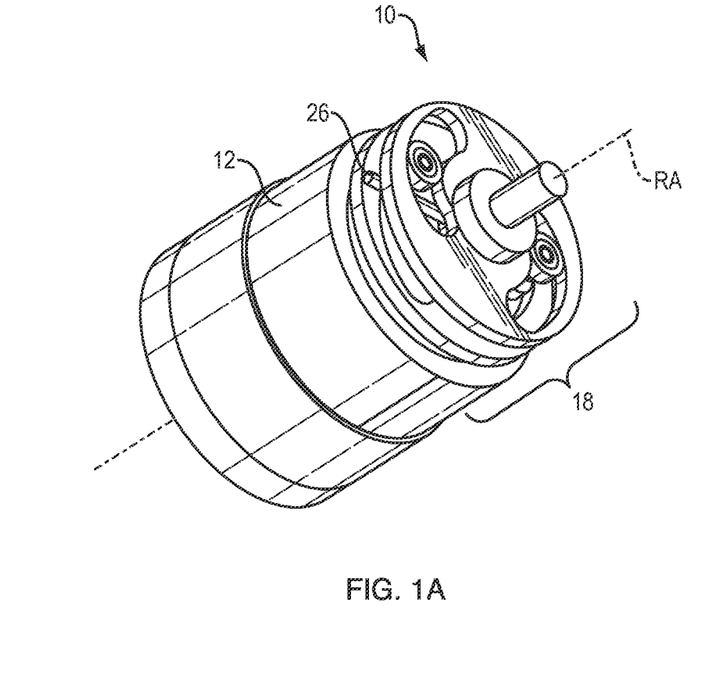
FIG. 1A is a schematic perspective view of an actuator assembly according to an embodiment of the present teachings.
Figure 1B:
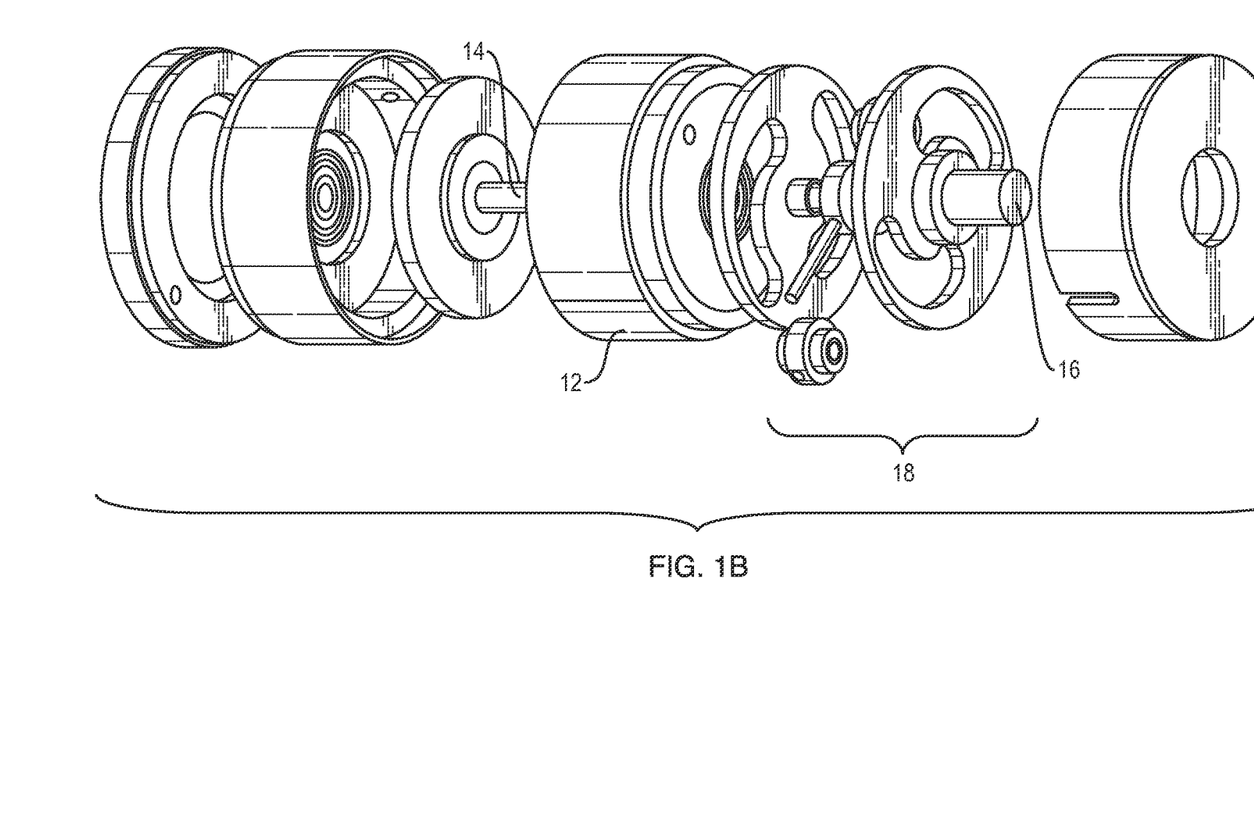
FIG. 1B is an exploded view of the actuator assembly depicted in FIG. 1A.
Figure 1C:
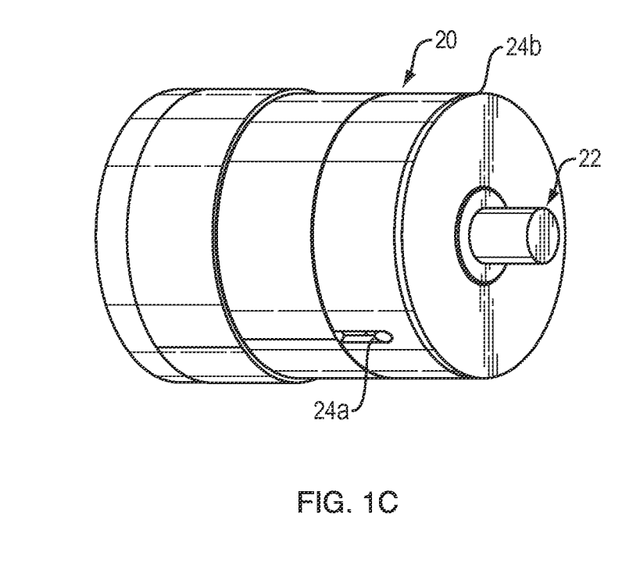
FIG. 1C is a schematic partial view of the actuator assembly depicted in FIG. 1A.
Figure 1D:
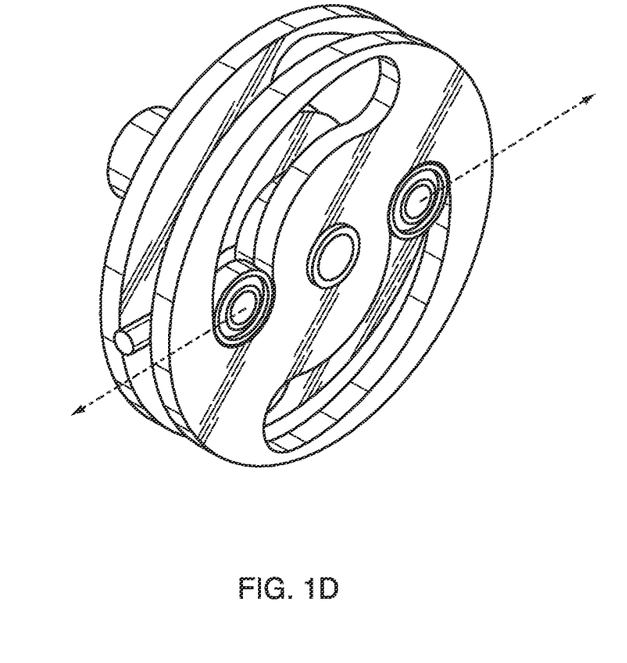
FIG. 1D is a schematic view of a rotary motion coupling mechanism employed in the actuator assembly of FIG. 1A.
Figure 1E:
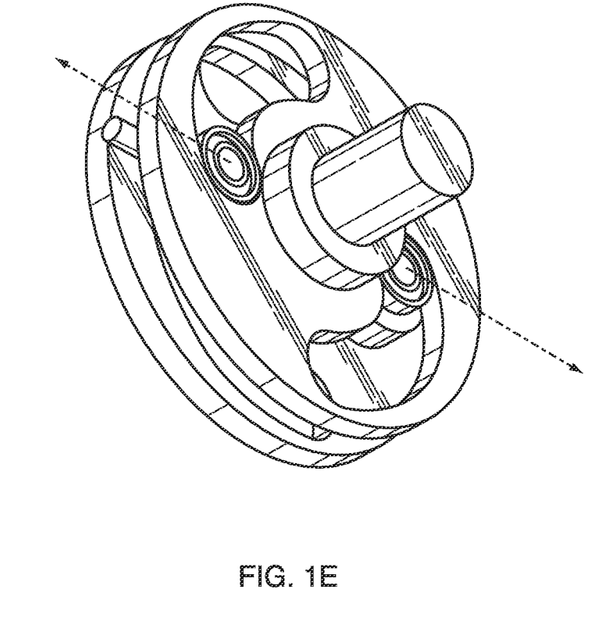
FIG. 1E is another schematic view of the rotary motion coupling mechanism.
Figure 1F:
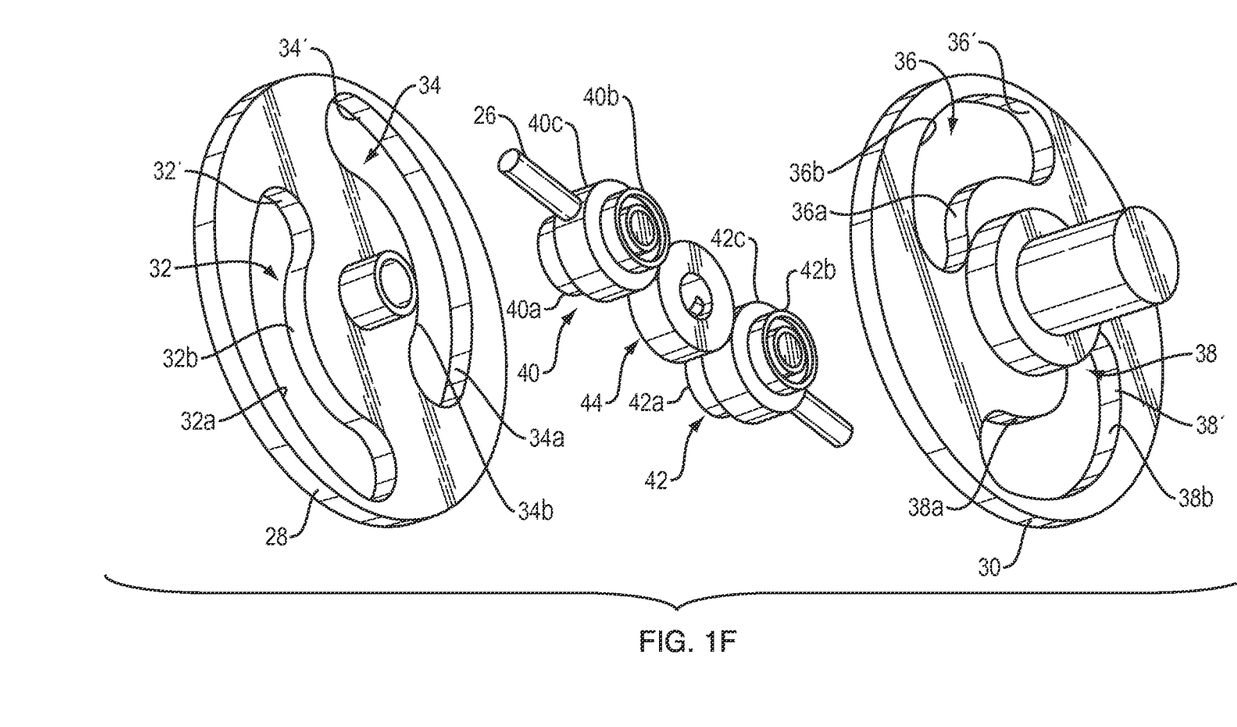
FIG. 1F is an exploded view of the rotary motion coupling mechanism illustrating a rotatable input element, a rotatable output element and a pair of coupling elements rotatably coupling the rotatable input element to the rotatable output element.

Similarly, the rotatable output element 30 includes a pair of cam profiles in the form of curvilinear boundary surfaces 36'/38' (herein also referred to as curvilinear boundaries) of two openings (slots) 36 and 38 formed therein. Each boundary surface includes an inner portion 36a/38a and an outer portion 36b/38b. Similar to the inner portions of the boundary surfaces of the slots of the input cam 28, each inner portion 36a/38a includes a convex central segment flanked by two concave segments and each outer portion 36b/38b is formed as a continuous convex surface. In this embodiment, the radius of curvature of the convex central segments of inner portions of the boundary surfaces of the slots of the output cam is less than the radius of curvature of the convex central segments of the inner portions of the boundary surfaces of the slots of the input cam.

The coupling mechanism 18 further includes a pair of coupling elements 40/42 in the form of a pair of rollers for rotationally coupling the rotatable input element 28 to the rotatable output element 30. Each coupling element 40/42 includes an inferior portion 40a/42a, a superior portion 40b/42b and a central portion 40c/42c. The inferior and the superior portions of each roller are rotatable about an axis of that roller. The inferior portions 40a/42a of the rollers couple to the slots 32/34 of the input cam so as to engage with the cam profiles 32'/34' and the superior portions 40b/42b of the rollers 40/42 couple to the slots 36/38 of the output cam to engage with the cam profiles 36'/38', thereby rotatably coupling the input cam to the output cam. More specifically, the tangential frictional forces exerted by the surface of a cam profile of the rotatable input element to an inferior portion of a roller engaged with that cam profile can cause the inferior portion to rotate, which in turn causes the rotation of the superior portion of that roller. As the superior portion of the roller is engaged with the surface of a cam profile of the rotatable output element, the rotation of the superior portion in turn causes the rotatable output element to rotate. Further, the radial forces exerted by the cam profiles of the input and the output rotatable elements, respectively, to inferior and superior portions of the roller causes radial motion of the roller (i.e., motion in a direction perpendicular to the rotational axis of the input and output shafts).

The central portion of each of the rollers 40/42 includes a bore for receiving the pin 26 (herein also referred to as a non-rotating guide). The pin 26 can extend between the two rollers through a connecting member 44. As noted above, the pin 26 is fixedly coupled to the housing 20 through slots 24a/24b, which function as rotation stops. Thus, each roller can move radially along the pin as the rotation of the cams cause its displacement relative to a slot in which it is disposed.

Referring to FIGS. 1B, 1D, 1E, and 1F, in use, the rotation of the input shaft 14 mediated by the limited angle actuator 12 causes the input cam 28 to rotate. The rotation of the input cam, in turn, causes different portions of the boundary surfaces of the slots 32/34 to engage with the inferior portions 40a/42a of the rollers 40 and 42, thereby applying radial and tangential forces thereto. These forces cause radial movement of the rollers along the pin 26 with the superior portions 40b/42b of the rollers causing the rotation of the output cam 30. The shapes of the boundary surfaces of the slots 32/34 and 36/38 as well as the angular positioning of the slots of the output cam relative to those of the input cam result in transformation of the input torque profile to a desired output torque profile. For example, the cam profiles of the rotatable input and output elements and the angular juxtaposition of the slots of the output cam relative to those of the input cam can result in variation of the radial distance of the rollers from the rotation axis and the engagement of the rollers with different portions of the cam profiles as a function of the stroke angle so as to transform the input torque profile to a desired output torque profile. In some embodiments, the radial distance traveled by the rollers relative to the rotation axis (herein also referred to as the radial stroke of the rollers) is equal to or less than about 25% of an outer diameter (OD) of the actuator. By way of example, in some embodiments, the radial stroke of the rollers is less than about 15 millimeters (mm).

In this embodiment, the slots in the input cam are disposed symmetrically about the rotation axis. Similarly, the slots in the output cam are disposed symmetrically relative to the rotation axis. Such symmetry can ensure that that radial forces exerted by one of the rollers on the input and output shafts are substantially countered by the respective radial forces exerted by the other roller.

In other words, the cam profiles of the input and output cams as well as their relative angular positions (e.g., the way the slot 36 is stacked over the slot 32) can be selected to provide a desired transformation of the input torque profile to obtain an output torque profile suitable for a particular application. For example, the coupling mechanism 18 can transform an input torque profile that is substantially uniform over a stroke angle into an output torque profile that exhibits a high torque at the beginning of a stroke and a decreasing torque (e.g., characterized by a substantially linear decrease) as the stroke angle increases.

In some embodiments, the output angular stroke can be different than the input angular stroke. By way of example, in some embodiments, the output angular stroke can be larger than the input angular stroke, e.g., the output angular stroke can be 50% larger than the input angular stroke, with the output torque at one end of the angular stroke being equivalent to or greater than the input torque. In some embodiments, the output/input torque ratio can vary in a range of about 0.7 to about 12, e.g., depending on a desired angular ratio between the input and output and a desired output torque profile.

In some embodiments, a ratio of the output torque relative to the input torque at one end of an angular stroke (herein Torque$_{ratio}$) can be in accordance with the following relation:

$$\text{Torque}_{ratio} = \frac{12}{\text{Stroke angular ratio}},$$

wherein, $$\text{Stroke Angular Ratio} = \frac{\text{Output angular stroke angle}}{\text{Input angular stroke angle}},$$

wherein, the output angular stroke angle denotes the total angle of rotation of the output shaft during one stroke, and the input angular stroke angle denotes the total angle of rotation of the input shaft during one stroke.

Figure 2B:
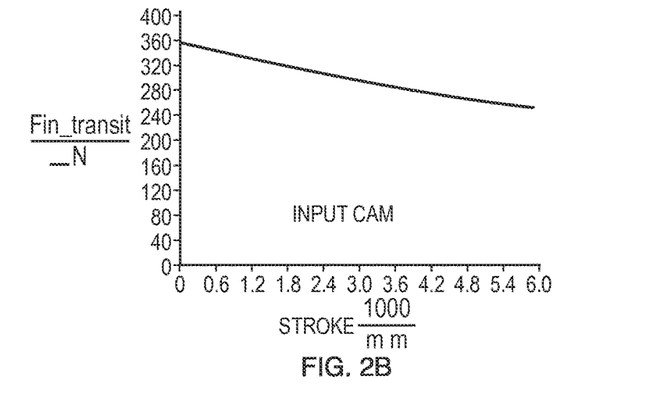
Figure 2C:
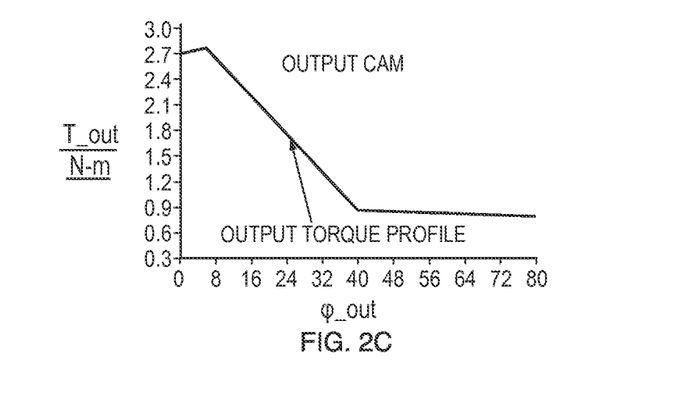

By way of example, as noted above, FIG. 2A depicts an exemplary input torque profile (i.e., input torque as a function of stroke angle) generated by a limited angle actuator and FIG. 2B shows the transformation of this input torque profile when only the input cam is utilized to transfer the rotary motion of the input shaft to the output shaft. FIG. 2C shows, in turn, an output torque profile obtained via transformation of the input torque profile depicted in panel A when both the input cam 28 and the output cam 30 are employed. These figures show that the use of only the input cam results in a slowly decreasing torque as a function stroke angle and the use of both the input and the output cams results in an initial increase in the output torque followed by a substantially linear decrease of the torque as a function of stroke angle at a much steeper slope than that observed when only the input can is utilized. This linearly decreasing torque region is followed by a substantially constant torque as a function of stroke angle until the end of the stroke.

Figures 3A, 3B:
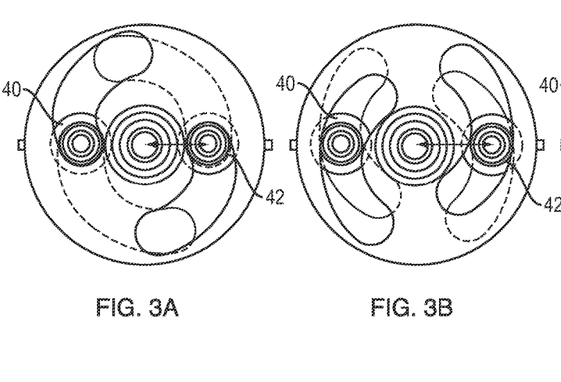
Figures 3C, 3D:
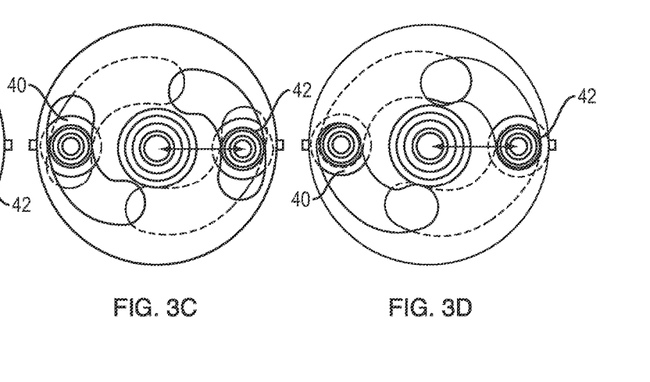
Figure 3E:
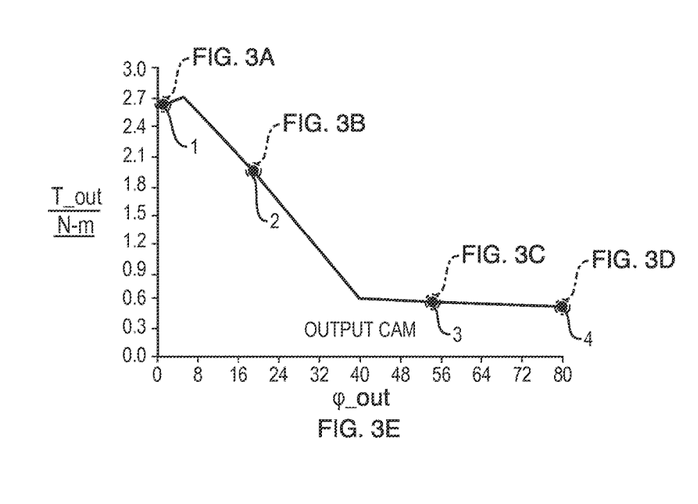

By way of further illustration, FIGS. 3A-3E show angular positions of the input and output cams relative to one another and the radial distances of the rollers relative to the rotation axis at four different stroke angles and the output torque generated at each of those stroke angles. In particular, FIG. 3A depicts the rollers 40 and 42 positioned at one of the ends of the slots of the cams corresponding to a minimum distance of the rollers from the rotation axis. The output torque at this position of the slots and the rollers is depicted by point 1 in the torque profile. FIG. 3B shows the positions of the cams and the rollers at a stroke angle corresponding to point 2 on the torque profile (on the decreasing portion of the torque profile) at which the rollers are farther away from the rotation axis. As the stroke angle increases, the rollers continue to move away from the rotation axis and the output torque continues to decrease until a stroke angle of about 40 degrees. Beyond this stroke angle, the output torque remains substantially uniform as the rollers continue to move away from the rotation axis. FIG. 3C depicts the position of the rollers at a stroke angle corresponding to point 3 on the torque profile in a region in which the output torque is substantially uniform. FIG. 3D depicts the rollers at the end of the stroke at which the rollers' distance from the rotation axis is at its maximum. The output torque at the end of the stroke is depicted by point 4 on the torque profile.

While in the above embodiment, the input shaft and the output shaft are axially aligned, in other embodiments the input shaft can be offset relative to the output shaft.

In many embodiments, the use of a plurality of cam profiles, rather than a single cam profile, according to the present teachings for transferring the rotary motion of an input shaft to that of an output shaft provides a number of advantages. For example, it allows minimizing, and preferably eliminating, parasitic forces that a single cam profile may generate. For example, in the above embodiment, the interaction between the input and output cams via the engagement of the coupling elements with their respective cam profiles can counter the parasitic forces that each of the input and/or output cams may individually generate. Moreover, the use of both an input cam and an output cam can provide additional flexibility in obtaining a desired transformation of an input torque profile into an output torque profile. In some embodiments, such a flexibility allows maintaining the input and the output shafts as co-linear (i.e., coaxial) while obtaining the desired transformation of the input torque profile into the output torque profile. The colinearity of the input shaft and the output shafts can in turn allow fabricating a more compact actuator assembly.

Figure 4A:
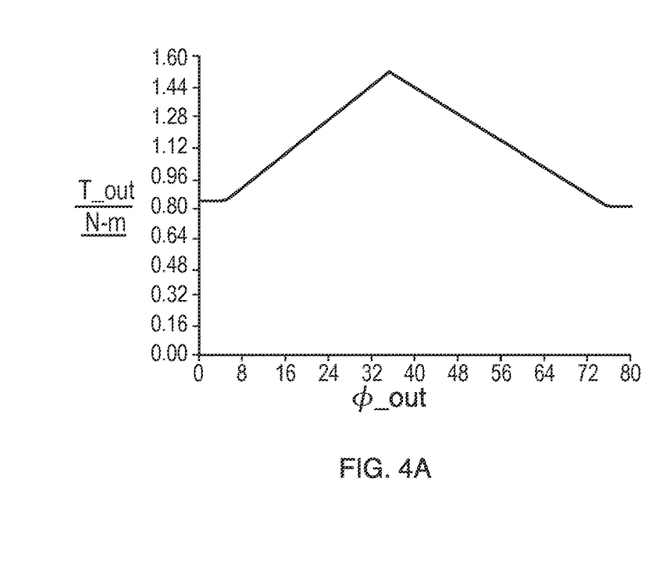
FIG. 4A is an exemplary output torque profile obtained by transforming a substantially uniform input torque profile by employing an embodiment of the present teachings, FIG. 4B in another exemplary output torque profile obtained by transforming a substantially uniform input torque profile by employing an embodiment of the present teachings, FIGS. 5A, 5B, and 5C schematically depict a cam angle, which is a parameter employed for designing cam profiles of an actuator according to some embodiments of the present teachings.
Figure 4B:
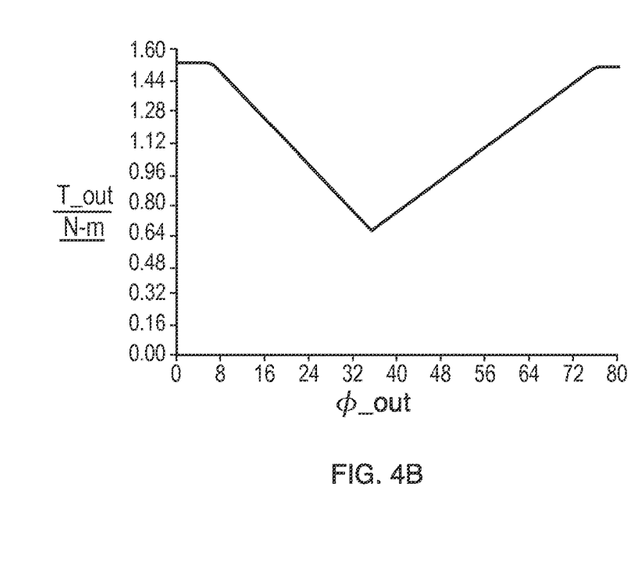

By way of example, the use of an input cam and an output cam in accordance with the above teachings can allow transforming an input torque profile that is substantially uniform over an angular stroke, into any of the output torque profiles shown in FIGS. 4A and 4B. In particular, the output torque profile shown in FIG. 4A exhibits an initial substantially flat (uniform) portion followed by a linearly increasing, a linearly decreasing, and a substantially flat end portion. In contrast, the output torque profile shown in FIG. 4B exhibits an initial substantially flat (uniform) portion followed by a linearly decreasing, a linearly increasing, and a substantially flat end portion. Such torque profiles can be particularly useful in a variety of automotive applications.

In some embodiments, an actuator assembly including the rotatable input and output elements and their respective cam profiles according to the above teachings can be designed in the following manner. In many cases, the design can be based on desired values for the following parameters: an output angular stroke (e.g., for a particular application), a desired maximum (peak) torque and the angular portion at which the maximum torque is needed, and the maximum work that is required. An actuator, e.g., a single phase actuator, can be selected that is capable of providing the work requirement given the acutator's efficiency (e.g., an actuator that is nominally capable of providing the work requirement plus 25% may be selected to take into account the system efficiency (e.g., 80%)). Subsequently, the maximum torque ratio (Max_Torque_Ratio) and the minimum torque ratio (Min_Torque_Ratio) can be defined as follows:

$$\text{Max\_Torque\_Ratio} = \frac{\text{maximum output torque required}}{\text{maximum available input torque}}$$

$$\text{Min\_Torque\_Ratio} = \frac{\text{maximum available input torque}}{\text{minimum output torque required}}$$

These two ratios help define and narrow the search window for the angles of the cam profiles. In some embodiments, if the two ratios are equal to or less than 3, the input cam angle can be kept constant over the stroke. For example, in some such embodiments, the input cam angle is selected to be in a range of about 10 degrees to about 15 degrees. In some embodiments, if one of the above ratios is greater than 3, then the values of both the input cam angle and the output cam angle can vary, e.g., in a range of about 3 degrees to about 45 degrees.

Figure 5A:
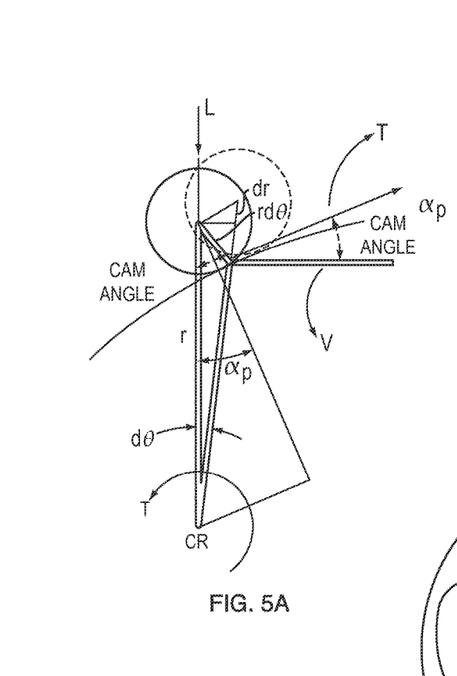
Figure 5B:
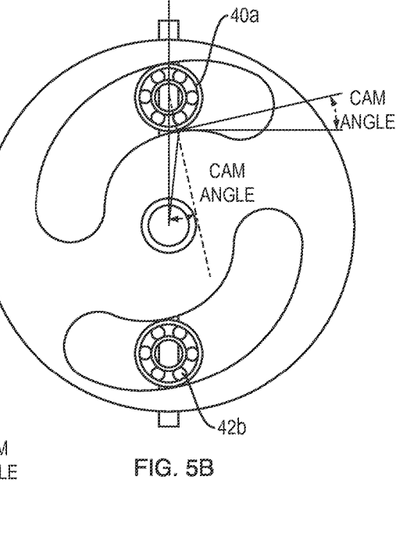
Figure 5C:
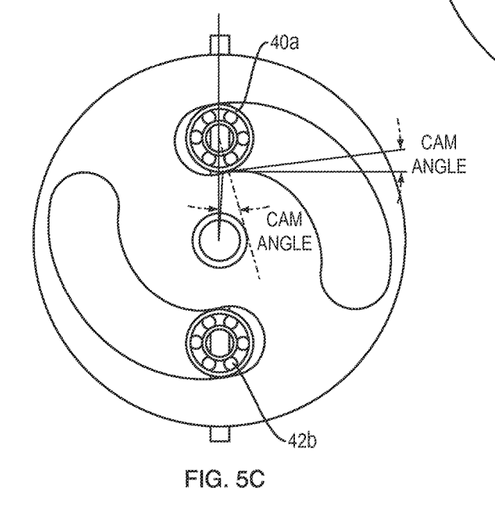

As shown schematically in FIGS. 5A, 5B and 5C, in this embodiment, a cam angle of a cam profile at a given point along the profile corresponds to an angle ($\alpha_p$) formed between a tangent (T) to an inferior or a superior portion of a roller (e.g., inferior portions 40a/42a or superior portions 40b/42b) associated with a cam profile at a point of contact of that portion with the cam profile and a line (V) connecting the center of that roller to the center of rotation (CR) of the rotatable element that includes that cam profile.

Figure 6A:
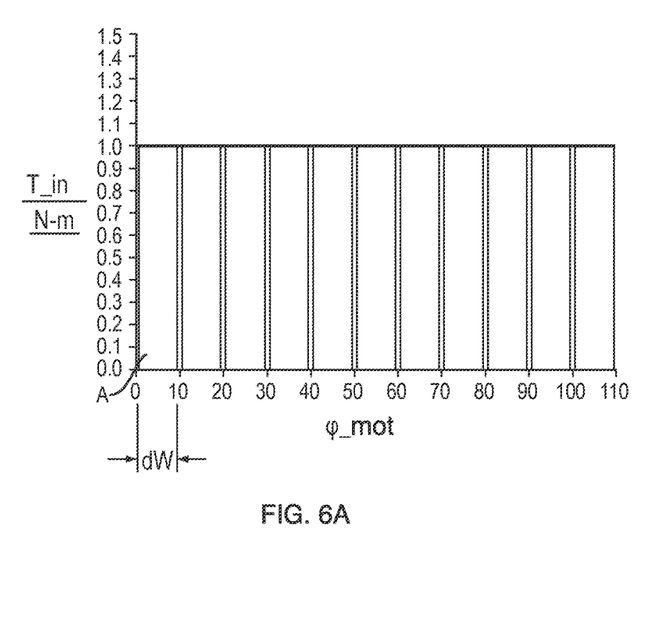
FIG. 6A depicts an exemplary input torque curve in which the area under the curve is discretized into a plurality of area increments.
Figure 6B:
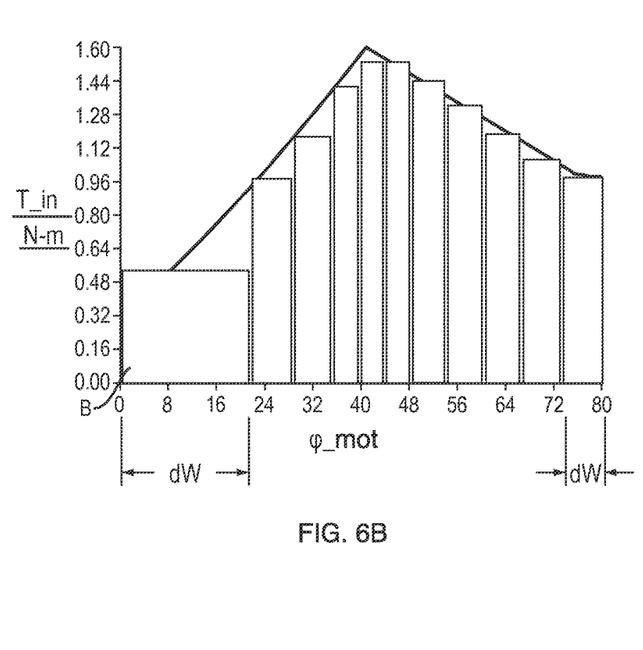
FIG. 6B depicts a desired output torque curve via a transformation of the input torque curve depicted in FIG. 6A, where the area under the output torque curve is discretized into the same number of area increments such that for each area increment of the input torque curve there is a corresponding area increment of the output torque curve providing the same amount of work, and FIGS. 7A and 7B schematically depict an embodiment of a torque actuator according to the present teachings, which includes a failsafe spring mechanism.

By way of illustration, FIG. 6A depicts an exemplary input torque profile (curve), e.g., a torque profile provided by a single phase actuator over an angular range extending from zero to 110 degrees, and FIG. 6B depicts a desired output torque profile (curve) to be generated via a plurality of cam profiles in accordance with the present teachings. In one exemplary design method, the area under the input torque curve associated with the actuator (i.e., the input torque curve) is discretized into a plurality of area increments. By way of example and only for illustration purposes, in this example, the input torque curve is flat (i.e., the input torque is 1 Nm over the 110 angular range), and the area under the input torque curve is discretized into 11 area portions, each of which spans a 10 degree angular interval and represents a discrete amount of work done by the input torque over that angular interval. The area under the output curve is also discretized into the same number of area increments such that for each area increment of the input torque curve there is a corresponding area increment of the output torque curve providing the same discrete amount of work. For example, the work performed by the input torque over an angular range of 0 to 10 degrees associated with the input area increment A is the same as the work performed by the output torque over an angular range of 0 to 20 degrees associated with the output area increment A.

Subsequently, for each input cam angle associated with each of the elementary areas of the input torque, the corresponding output cam angle associated with a corresponding elementary area of the output torque is calculated. In particular, for each pair of elementary work areas, one can calculate the angle ratio (or torque ratio) between an input cam angle and a corresponding output cam angle. As noted above, in some embodiments, the input cam angle remains constant over the stroke, and the angle ratio allows calculating the output cam angle associated with each elementary area of the output torque. It should be understood that any number of area increments can be employed. As the number of area increments increases so does the resolution of the calculated cam profiles In some embodiments, one or more of the coupling elements employed to transfer the rotary motion of the input cam to the output cam can be formed of a thermally insulating material. This can help in minimizing transfer of heat from an application, e.g., an EGR valve, to the actuator or vice versa. By way of example, one or both of the above rollers 40/42 can be formed of a thermally insulating material, such as polyimides. For example, a material marketed by Dupont, U.S.A. under the trade designation Vespel® can be employed for fabricating the coupling elements.

Figure 7A:
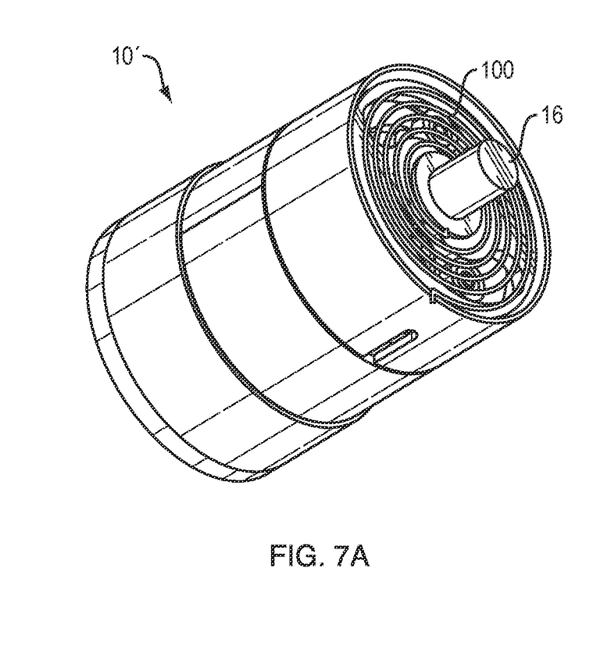
Figure 7B:
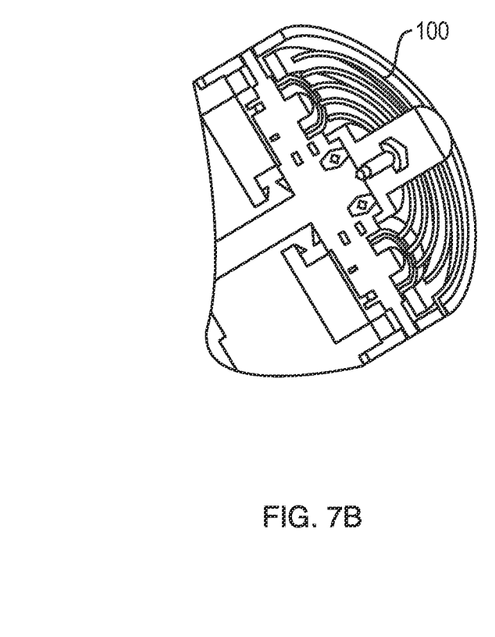

In some embodiments, an actuator assembly according to the present teachings includes a failsafe spring mechanism. By way of example, FIGS. 7A and 7B schematically depict an exemplary implementation of such an embodiment that includes a spring 100 (herein also referred to as a "return spring") that is coupled at one end to the output shaft 16 of the actuator and at its other end to the actuator's housing or frame 20. In this embodiment, at 0° angular stroke of the actuator (initial or home position), the return spring 100 is preloaded, that is, it exerts a small amount of restoring torque to the output shaft to ensure that the output shaft is in fact positioned at the nominal 0°. The restoring torque exerted by the return spring can increase, at a rate depending on the stiffness of the spring (i.e., the spring constant), over the angular stroke until it reaches its maximum value at the end of the stroke. In some embodiments, the return spring can be utilized to counter friction from an application to which the actuator is coupled, for load inertia, and/or to cause the actuator to return to home position without a need to electrically energize the actuator.

An actuator assembly according to the present teachings can find a variety of applications. For example, it can be employed in automotive applications, e.g., for opening and closing EGR valves. The ability to tailor the output torque to the requirement of a specific application allows actuator assemblies according to the present teachings to achieve the requirements of a variety of applications more efficiently and with a lower size than conventional actuators. Further, rather than utilizing different actuators (e.g., different single phase actuators) for different applications requiring different torque profiles, one can employ the same actuator but with different cam profiles to transform the actuator's input torque profile to a desired output torque profile.

Those having ordinary skill in the art will appreciate that various changes can be made to the above embodiments without departing from the scope of the invention.

What is claimed is:

1. An actuator assembly, comprising:
a rotatable input element coupled to an input shaft and configured to rotate with the input shaft, said rotatable input element having a first cam profile comprising at least one slot having a curvilinear boundary;
a limited angle electromagnetic actuator coupled to the input shaft and configured to rotate the input shaft to cause rotation of the rotatable input element and generate an input torque profile over an input stroke;
a rotatable output element coupled to an output shaft and configured to rotate with the output shaft, said rotatable output element having a second cam profile comprising at least one slot comprising a curvilinear boundary;
at least one coupling element, the coupling element comprising an inferior portion and a superior portion;
a pin to which the at least one coupling element is slidably coupled, the pin is non-rotatable with respect to the input and output shafts;
wherein the rotation of the rotatable input element is configured to engage the curvilinear boundary of the at least one slot of the rotatable input element with the inferior portion of the at least one coupling element, thereby applying a radial and tangential force thereto, and the radial and tangential force is configured to cause the superior portion of the at least one coupling element to engage the curvilinear boundary of the at least one slot of the rotatable output element and cause rotation of the output element and generate an output torque profile over an output stroke; and
wherein shape and angular positioning of the curvilinear boundary of the at least one slot of the rotatable output element relative to shape and angular positioning of the curvilinear boundary of the at least one slot of the rotatable input element are configured such that they transform the input torque profile to a desired output torque profile.

2. The actuator assembly of claim 1, wherein said input shaft is collinear with said output shaft along a rotational axis.

3. The actuator assembly of claim 2, wherein said at least one coupling element is configured to remain rotationally fixed relative to said axis of rotation of the input and the output shafts.

4. The actuator assembly of claim 2, wherein said coupling element is configured to remain rotationally fixed relative to said rotational axis.

5. The actuator of claim 2, wherein said coupling element is configured to move radially relative to said rotational axis.

6. The actuator assembly of claim 5, wherein said coupling element has a radial stroke less than about 25% of an outer diameter (OD) of said actuator.

7. The actuator assembly of claim 1, wherein said rotatable input element comprises a first rotatable plate.

8. The actuator assembly of claim 7, wherein said rotatable output element comprises a second rotatable plate.

9. The actuator of claim 8, wherein said at least one coupling element comprises at least one roller.

10. The actuator of claim 1, wherein each of said rotatable input and output elements comprises a pair of cam profiles, and wherein said at least one coupling element comprises a pair of rollers.

11. The actuator of claim 10, wherein each of said pair of rollers comprises an inferior portion engaged with one of the cam profiles of the rotatable input element and a superior portion engaged with a respective cam profile of the rotatable output element.

12. The actuator of claim 9, wherein the pin extends radially beyond a perimeter of the input and output plates, and wherein the pin is configured to engage with a rotation stop.

13. The actuator assembly of claim 12, wherein the rotation stop comprises a slot formed in a housing of said actuator assembly.

14. The actuator assembly of claim 1, wherein said actuator assembly is configured to provide an output angular stroke that is different than an input angular stroke.

15. The actuator assembly of claim 14, wherein said output angular stroke is 50% greater than the input angular stroke.

16. The actuator assembly of claim 1, wherein a ratio of the output torque relative to the input torque is in a range of about 0.7 to about 12.

17. The actuator assembly of claim 1, further comprising a return spring coupled to the output shaft for providing a restoring force as the output shaft rotates.

18. An actuator assembly, comprising:
an input shaft,
an output shaft,
a limited angle electromagnetic actuator coupled to the input shaft for rotating the input shaft to generate an input torque profile over an input angular stroke,
a rotatable input element having a pair of input cam profiles, said rotatable input element being adapted to couple to said input shaft to rotate therewith,
a rotatable output element having a pair of output cam profiles, said rotatable output element being adapted to couple to said output shaft to rotate therewith,
a pair of rollers for rotatably coupling said rotatable input element to said rotatable output element, each of said rollers having an inferior portion for engaging with one of said input cam profiles and a superior portion for engaging with one of said output cam profiles;
a pin to which the pair of rollers are slidably coupled, the pin is non-rotatable with respect to the input and output shafts;
wherein shape and angular positioning of the input cam profiles of the rotatable output element relative to shape and angular positioning of the output cam profiles are configured such that they transform the input torque profile to a desired output torque profile.

19. The actuator assembly of claim 18, wherein said input and output shafts are coaxial along a rotation axis.

20. The actuator assembly of claim 18, wherein said rotatable input element comprises a rotatable input plate and said pair of input cam profiles comprise boundaries of a pair of openings formed in said rotatable input plate.

21. The actuator assembly of claim 18, wherein said rotatable output element comprises a rotatable output plate and said pair of output cam profiles comprise boundaries of a pair of openings formed in said rotatable output plate.

* * * * *